(12) United States Patent
Zhang et al.

(10) Patent No.: US 10,574,590 B2
(45) Date of Patent: Feb. 25, 2020

(54) CENTRAL SYSTEM IN INTELLIGENT TRAFFIC CLOUD CONTROL SYSTEM

(71) Applicant: KYLAND TECHNOLOGY CO., LTD., Beijing (CN)

(72) Inventors: Fusheng Zhang, Beijing (CN); Guozhen Ma, Beijing (CN); Zhiwei Yan, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 568 days.

(21) Appl. No.: 15/367,854

(22) Filed: Dec. 2, 2016

(65) Prior Publication Data

US 2018/0091439 A1 Mar. 29, 2018

(30) Foreign Application Priority Data

Sep. 26, 2016 (CN) .......................... 2016 1 0851853

(51) Int. Cl.
*G06F 15/16* (2006.01)
*H04L 12/911* (2013.01)
*H04L 29/12* (2006.01)
*H04L 29/08* (2006.01)

(52) U.S. Cl.
CPC .......... *H04L 47/82* (2013.01); *H04L 61/2007* (2013.01); *H04L 67/10* (2013.01)

(58) Field of Classification Search
CPC .. G08G 1/0116; G08G 1/0133; G08G 1/0145; G08G 1/081; H04L 47/82; H04L 61/2007; H04L 67/10

USPC ......................................................... 709/226
See application file for complete search history.

(56) References Cited

U.S. PATENT DOCUMENTS

| 6,317,058 B1 | 11/2001 | Lemelson et al. |
| 8,928,493 B2 | 1/2015 | Mantalvanos |
| 2003/0020633 A1 | 1/2003 | Lee |
| 2008/0074289 A1* | 3/2008 | Sauder .................... G08G 1/07 340/909 |
| 2008/0238720 A1 | 10/2008 | Lee |

(Continued)

FOREIGN PATENT DOCUMENTS

| JP | 2003016581 A | 1/2003 |
| JP | 2006259833 A | 9/2006 |
| JP | 2006260483 A | 9/2006 |

(Continued)

*Primary Examiner* — Normin Abedin
(74) *Attorney, Agent, or Firm* — Arent Fox LLP; Michael Fainberg

(57) ABSTRACT

This application relates to an intelligent traffic cloud control system based central system so as to address the problems of the central system in the relevant art being overloaded, and operating at a low rate. An intelligent traffic cloud control system according to an embodiment of this application at least includes a central system, a plurality of control servers, and a plurality of field devices, wherein the central system is connected with the control servers over a network, and the field devices are connected with the control servers over IP address based broadband buses; and the central system is configured to collect data in one or more of the following data collecting modes: monitoring state data of the control servers in real time, inquiring about data from the control servers in non-real time, and subscribing to data from the control servers as needed.

8 Claims, 2 Drawing Sheets

(56) References Cited

U.S. PATENT DOCUMENTS

2011/0191011 A1    8/2011  McBride et al.
2012/0038490 A1*   2/2012  Verfuerth ........... H05B 37/0272
                                                          340/910

FOREIGN PATENT DOCUMENTS

| | | |
|---|---|---|
| JP | 2008092279 A | 4/2008 |
| JP | 2011090554 A | 5/2011 |
| JP | 2011514584 A | 5/2011 |
| JP | 2013186772 A | 9/2013 |
| JP | 2015184821 A | 10/2015 |
| JP | 2015230579 A | 12/2015 |
| WO | 2005010846 A | 2/2005 |
| WO | 2014104869 A1 | 7/2014 |
| WO | 2016127803 A | 8/2016 |
| WO | 2016127950 A1 | 8/2016 |

* cited by examiner

CENTRAL SYSTEM IN INTELLIGENT TRAFFIC CLOUD CONTROL SYSTEM

CROSS-REFERENCE TO RELATED APPLICATION

This application claims the benefits and priorities of Chinese Patent Application No. 201610851853.5 filed on Sep. 26, 2016, which is hereby incorporated by reference in its entirety.

FIELD

This application relates to the field of intelligent traffic technology, and particularly to an intelligent traffic cloud control system-based central system.

BACKGROUND

With the development of economy in China, the number of urban population is increasing, which promotes the development of the cities, but brings pressure to the urban traffic. At present, traffic accidents and traffic jams frequently occur in various major cities, thus bringing a lot of inconvenience to our life.

In the relevant art, the intelligent traffic control system generally includes control servers distributed at the traffic intersections and a central system, where each control server at the intersections is equivalent to an intelligent cloud node in the intelligent traffic control system. Specifically, the control server collects real time traffic data at the corresponding intersections through monitoring devices distributed in respective directions of the intersections, where the real time traffic data may include vehicle flow, vehicle speeds, traffic violations, and traffic equipment failure, etc., and then transmits these real time traffic data to the central system, and the central system analyzes and processes the traffic data of the respective control servers, and then transmits the control instructions to the corresponding control servers to manage and control of the traffic conditions at each intersection where a control server is located Thus the central system needs to store, perform statistic analysis, process, and control the data collected in real time by all the control servers in a service area thereof, so that the central system may be overloaded, operate at a low rate, and fail to adjust in real time the control strategies for the respective control servers.

As can be apparent, the central system in the intelligent traffic control system in the relevant art suffers from the problems of being overloaded, and a low operating rate.

SUMMARY

Embodiments of this application provide a central system in an intelligent traffic cloud control system so as to address the problems of the central system in the intelligent traffic control system in the relevant art being overloaded, and operating at a low rate.

An embodiment of this application provides an intelligent traffic cloud control system based central system, where the intelligent traffic cloud control system at least includes the central system, a plurality of control servers, and a plurality of field devices, wherein the central system is connected with the control servers over a network, and the field devices are connected with the control servers over Internet Protocol (IP) address based broadband buses; and the central system is configured to collect data in one or more of the following data collecting modes:

monitoring state data of the control servers in real time, inquiring about data from the control servers in non-real time, and subscribing to data from the control servers as needed.

Optionally the central system includes:

a central interacting module configured to determine a first control instruction corresponding to selected one of the data collecting modes, and to transmit the first control instruction to a central managing and controlling module;

the central managing and controlling module configured to receive the first control instruction transmitted by the central interacting module, and according to the first control instruction, to obtain data to be processed, which is transmitted by at least one control server through an interface module, and to process the obtained data to be processed to generate a second control instruction; and to issue the second control instruction to the at least one control server through the interface module, wherein the data to be processed are data collected in the selected data collecting mode; and the interface module configured to obtain the data to be processed from the at least one control server, to transmit the data to be processed to the central managing and controlling module and to transmit the second control instruction issued by the central managing and controlling module to the at least one control server.

Optionally the central interacting module further includes: a real time interacting unit configured, when there is a need for monitoring state data of the control server in real time, to generate the first control instruction to monitor the state data in real time, and to transmit the first control instruction to a real time managing and controlling unit;

the central managing and controlling module further includes: the real time managing and controlling unit configured to receive the first control instruction transmitted by the real time interacting unit, to obtain the state data transmitted by the at least one control server through a real time transmitting unit according to the first control instruction, and to process the obtained state data to generate the second control instruction; and to issue the second control instruction to the at least one control server through the real time transmitting unit; and the interface module further includes: the real time transmitting unit configured to obtain the state data from the at least one control server, to transmit the state data to the real time managing and controlling unit, and to transmit the second control instruction issued by the real time managing and controlling unit to the at least one control server.

Optionally the central interacting module further includes: a non-real time interacting unit configured, when there is a need for inquiring about data from the control server in a non-real time manner, to generate the first control instruction to inquire about data in a non-real time manner, and to transmit the first control instruction to a non-real time managing and controlling unit;

the central managing and controlling module further includes: a non-real time managing and controlling unit configured to receive the first control instruction transmitted by the non-real time interacting unit, to obtain inquiry data transmitted the at least one control server though a non-real time transmitting unit according to the first control instruction, and to process the obtained inquiry data to generate the second control instruction; and to issue the second control instruction to the at least one control server through the non-real time transmitting unit; and the interface module further includes: the non-real time transmitting unit configured to obtain the inquiry data from the at least one control server, to transmit the inquiry data to the non-real time managing and controlling unit, and to transmit the second control instruction issued by the non-real time managing and controlling unit to the at least one control server.

Optionally the central interacting module further includes: a subscription interacting unit configured, when there is a need for subscribing to data from the control server, to generate the first control instruction to subscribe to data, and to transmit the first control instruction to a subscription managing and controlling unit;

the central managing and controlling module further includes: the subscription managing and controlling unit configured to receive the first control instruction transmitted by the subscription interacting unit, to obtain subscription data transmitted by the at least one control server through a subscription transmitting unit according to the first control instruction, and to process the obtained subscription data to generate the second control instruction; and to issue the second control instruction to the at least one control server through the subscription transmitting unit; and the interface module further includes: the subscription transmitting unit configured to obtain the subscription data from the at least one control server, to transmit the subscription data to the subscription managing and controlling unit, and to transmit the second control instruction issued by the subscription managing and controlling unit to the at least one control server.

Optionally the central system further includes one or more of the following modules:

a network service module configured to respond to an access request of an intelligent terminal to the central system over the network;

a message service module configured to provide correspondence between the first control instruction, and data format of data to be collected, so that the central managing and controlling module collects data from the control server, according to the correspondence;

a geographic information system service module configured to provide the central system with a road planning service to manage and control the control server, according to a geographical database;

a content database module comprising a real time database configured to store state data, a non-real time database configured to store inquiry data, and a message database configured to store subscription data, where the state data, the inquiry data, and the subscription data are obtained from the control server and used for providing the central system with the basic traffic data to manage and control the control server; and a geographical database module configured to store road positional information in an area managed and controlled by the central system, and to provide the central system with the road positional information to manage and control the control server.

Optionally the central system further includes:

an information distributing module configured to generate information to be distributed, and to transmit the information to be distributed, to at least one of the plurality of control servers.

Optionally the central system further includes:

a user accessing module configured to provide a user access interface via which an operation instruction from a system operator is received.

Optionally the central managing and controlling module is further configured to perform one or more of:

operational monitoring, video monitoring, a basic data service, vehicle information recording and monitoring, and operation and maintenance management.

Optionally the interface module further includes one or more of:

a traffic data interface unit configured to obtain traffic data of the control server according to the selected data collecting mode;

a video interface unit configured to obtain video data of the control server according to the selected data collecting mode;

a regulation violation data interface unit configured to obtain vehicle regulation violation data of the control server according to the selected data collecting mode; and a system data interface unit configured to obtain control information of the control server on the field device according to the selected data collecting mode.

In the embodiments of this application, the intelligent traffic cloud control system at least includes a central system, a plurality of control servers, and a plurality of field devices, wherein the central system is connected with the control servers over a network, and the field devices are connected with the control servers over IP address based broadband buses; and the central system is configured to collect data in one or more of the following data collecting modes: monitoring state data of the control servers in real time, inquiring about data from the control servers in non-real time, and subscribing data from the control servers as needed. In the embodiments of this application, the central system can monitor in real time both operating conditions of the control servers, and local traffic conditions of the control servers; and can further inquire traffic data of the control servers from the control servers as needed in a non-real time manner; and moreover some condition can be further preset in the central system, and if the condition is triggered, then the traffic data will be transmitted automatically from the control servers to the central system. As can be apparent, the central system in the embodiments of this application can obtain data selectively from the control servers to thereby alleviate a burden on the central system so as to improve the operating rate thereof.

DETAILED DESCRIPTION OF THE EMBODIMENTS

An intelligent traffic cloud control system according to an embodiment of this application at least includes a central system, a plurality of control servers, and a plurality of field devices, wherein the central system is connected with the control servers over a network, and the field devices are connected with the control servers over IP address based broadband buses; and the central system is configured to collect data in one or more of the following data collecting modes: monitoring state data of the control servers in real time, inquiring about data from the control servers in non-real time, and subscribing data from the control servers as needed. In the embodiments of this application, the central system can monitor in real time both operating conditions of the control servers, and local traffic conditions of the control servers; and can further inquire traffic data of the control servers from the control servers as needed in a non-real time manner; and moreover some condition can be further preset in the central system, and if the condition is triggered, then the traffic data will be transmitted automatically from the control servers to the central system. As can be apparent, the central system in the embodiments of this application can obtain data selectively from the control servers to thereby alleviate a burden on the central system so as to improve the operating rate thereof.

Figure 1:
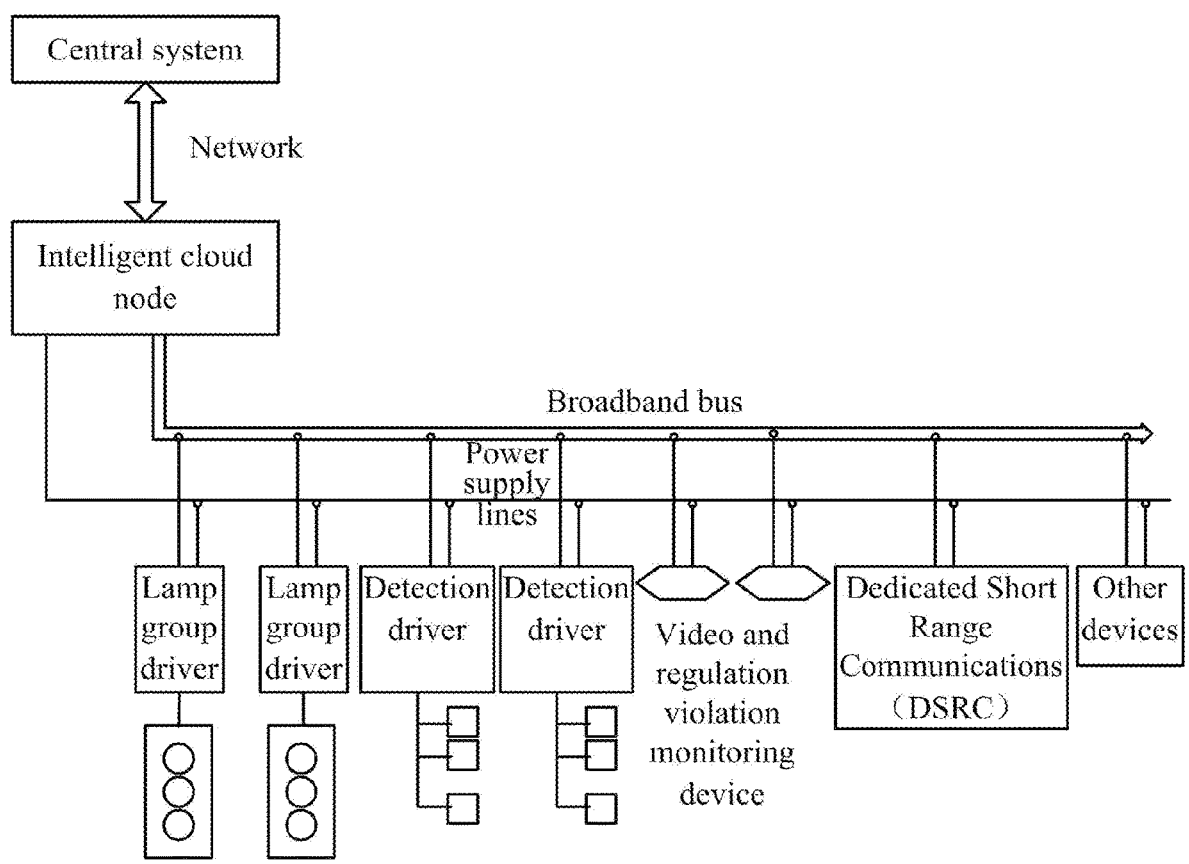
FIG. 1 is a schematic diagram of an intelligent traffic cloud control system according to an embodiment of this application.
Figure 2:
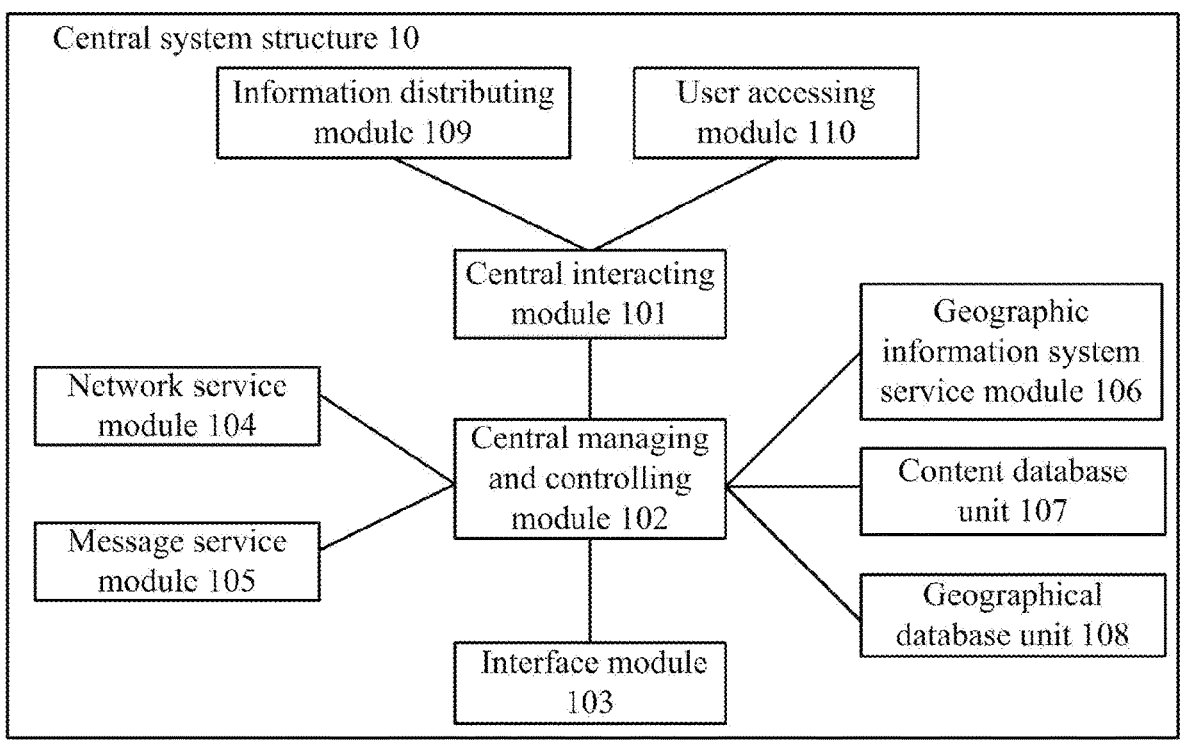
FIG. 2 is a schematic structural diagram of a central system in the intelligent traffic cloud control system according to the embodiment of this application.

In order to facilitate understanding of the intelligent traffic cloud control system according to the embodiments of this application, firstly the structure of the system will be described here, and as illustrated in FIG. 2, the intelligent traffic cloud control system includes: at least one control server (intelligent cloud node) arranged at each intersection, and a plurality of field devices communicating therewith over IP address based broadband buses, where the field devices are configured to collect traffic data; and the control servers are configured to process centrally the traffic data collected by the field devices, and to control local traffic through edge computing, and/or when it is determined that a preset triggering condition is satisfied, in the pre-created customized area served by the control server, then if the control server is a master control server, the master control server is configured to generate a coordinated control strategy through self-learning and edge computing, and to perform coordinated control in the pre-created customized area; and if the control server is a slave control server, the slave control server is configured to retrieve a coordinated control strategy from a master control server through cloud system. Furthermore the intelligent traffic cloud control system further includes a central system configured to exchange data with the plurality of control servers over a network, to share the data stored in the control server connected therewith, and to analyze and process the shared data; and to generate a coordinated control strategy according to a result of analyzing and processing, and to transmit the coordinated control strategy to a corresponding control server; and the control server is further configured to retrieve the coordinated control strategy from the central system through cloud system, and to operate according to the coordinated control strategy. where in order to facilitate management on the field devices, the control servers allocate IP addresses for the respective field devices, and the field devices set up communication links through IP-based addressing, so the field devices can be referred to as IP-based field devices.

The embodiments of this application will be described below in further details with reference to the drawings.

An embodiment of this application provides an intelligent traffic cloud control system based central system, the intelligent traffic cloud control system at least includes the central system, a plurality of control servers, and a plurality of field devices, wherein the central system is connected with the control servers over a network, and the field devices are connected with the control servers over IP address based broadband buses; and the central system is configured to collect data in one or more of the following data collecting modes:

monitoring state data of the control servers in real time, inquiring about data from the control servers in non-real time, and subscribing data from the control servers as needed.

Particularly the central system monitoring the state data of the control servers in real time refers to monitoring in real time some operating states of the control servers for the purpose of enabling the control servers to operate normally; the central system inquiring the data from the control servers in a non-real time manner refers to that the central system can inquire some data from the control servers as needed; and the central system subscribing to the data from the control servers as needed refers to that the central system can preset some condition, and if the condition is satisfied, then the control servers will transmit the data subscribed to the central system.

In order to better describe the central system in this application, firstly the control server will be described here in brevity. A control server according to an embodiment of this application can store traffic data collected by the control server, can further analyze and process these traffic data, and can manage and control local traffic according to a result of analyzing and processing the traffic data. Moreover the control server can transmit data to be processed to the central system according to the result of analyzing and processing the traffic data, upon reception of an instruction transmitted by the central system to obtain the data, and furthermore if the central system generates a corresponding control instruction after analyzing the data to be processed, then the control server can further adjust a local traffic management and control strategy upon reception of the control instruction. As can be apparent, in the embodiments of this application, the data obtained by the central system, which is transmitted by the control server, can be traffic data generated by the control server analyzing and processing the collected raw traffic data, or can be the raw traffic data collected by the control server.

As illustrated in FIG. 2, there is a schematic structural diagram of a central system 10 in an intelligent traffic cloud control system according to an embodiment of this application, the central system includes:

A central interacting module 101 is configured to determine a first control instruction corresponding to a selected one of the data collecting modes, and to transmit the first control instruction to a central managing and controlling module.

In practical application, a collecting period of time corresponding to the data required by the control instruction can be further determined while determining the first control instruction e.g., one day or one hour. For the two acquisition modes that the central system inquires the data from the control server in non-real time, and subscribes to the data from the control server as needed, there may be various types of first control instructions corresponding to these two data collecting modes, for example, to obtain regulation violation information of vehicles, to obtain information about vehicles in a blacklist, to obtain information about a traffic flow, etc. In order to distinguish the various types of first control instructions, they can be numbered, for example, a control instruction for obtaining regulation violation information of vehicles is numbered 001, a control instruction for obtaining information about vehicles in a blacklist is numbered 002, and a control instruction for obtaining information about a traffic flow is numbered 003, so that if a control instruction to obtain regulation violation information of vehicles collected from 9:00 to 13:00 on the day is transmitted, then the central interacting module 101 will determine that the number of the first control instruction is 001, and the collecting period of time corresponding to the regulation violation information of vehicles to be obtained for the control instruction is 9:00 to 13:00 on the day.

The central managing and controlling module 102 is configured to receive the first control instruction transmitted by the central interacting module, and thereafter according to the first control instruction, to obtain data to be processed which is transmitted by at least one control server through an interface module, and to process the obtained data to be processed to generate a second control instruction; and to issue the second control instruction to the at least one control server through the interface module, where the data to be processed are data collected in the selected data collecting mode.

In practical application, after receiving the first control instruction which is transmitted by the central interacting module, the central managing and controlling module, the central managing and controlling module obtains the data to be processed which is transmitted by the control server through the interface module according to the first control instruction, where the central managing and controlling module obtains the data from the control server according to the first control instruction, which can instruct the control server to transmit its network condition information in real time, can instruct the control server to transmit the data to be processed to the central managing and controlling module periodically (e.g., weekly), or can instruct the control server to transmit the data to be processed to the central managing and controlling module when some condition is satisfied, for example, there is a traffic jam, a traffic accident, or traffic control occurring. For example, if the first control instruction is configured to instruct the control server to transmit the information about a traffic flow to the central managing and controlling module when there is a local traffic jam, then if there is a traffic jam where a control server is located (hereinafter "current control server"), then the control server will transmit statistical local traffic flow information in the current period of time to the central managing and controlling module through the interface module, and the central managing and controlling module will obtain traffic data of other control servers proximate to the current control server after obtaining the traffic flow information from the current control server. Furthermore the central managing and controlling module analyzes these traffic data, and if it is determined that the traffic condition corresponding to one or more other control servers proximate to the control server is good, then the central managing and controlling module can issue control instruction to notify the current control server of information about a smooth road segment. Furthermore the current control server can display the information about the smooth road segment on traffic display devices in their service areas upon reception of the control instruction for the purpose of directing locally those vehicles in a road segment with the traffic jam, and vehicles proximate to the road segment with the traffic jam.

Optionally the central managing and controlling module is further configured to perform one or more of the following functions: operation monitoring, video monitoring, a basic data service, vehicle information recording and monitoring, and operation and maintenance management.

The functions above of the central managing and controlling module 102 will be described below respectively.

Firstly operation monitoring will be described. Operation monitoring generally includes six aspects which are traffic summary monitoring, electronic map monitoring, zone state monitoring, control server state monitoring, intersection state monitoring, and central service monitoring, where traffic summary monitoring relates to monitoring a vehicle flow, a vehicle speed, vehicle passing rate on a road in some time period, a saturation (the ratio of a real vehicle flow at an intersection to the maximum vehicle flow in saturated state), a smooth, traffic jam, or busy state of the road, and whether the control server fails, in the service area of the central system as a whole; electronic map monitoring refers to monitoring road distributions and field device distributions in respective traffic areas, and traffic conditions of corresponding roads for the purpose of intuitive knowledge of traffic condition information, where, for example, if the road condition of some road segment is a traffic jam, then the corresponding road segment in an electronic map will be displayed in read, if the road condition of some road segment is busy, then the corresponding road segment in an electronic map will be displayed in yellow, and if the road condition of some road segment is smooth, then the corresponding road segment in an electronic map will be displayed in green; zone state monitoring refers to making a statistic of, and displaying traffic data in different traffic areas, and furthermore gaining traffic conditions in different traffic areas from the statistically displayed data and their variations; control server state monitoring refers to monitoring the online (the control server is connected normally over the network) or offline (the control server is connected abnormally over the network) state of the control server, whether the control server is controlled by the central system, locally, or manually, and whether the field device fails; intersection state monitoring refers to monitoring operating data of vehicles, live information about road segments, operating conditions of field devices, at some selected intersection; and central service monitoring refers to monitoring the operating condition of the central system.

Secondly video monitoring will be described. Video monitoring provides two functions which are real time monitoring and history playback, where the real time monitoring may refer to monitoring video pictures of a plurality of selected intersections concurrently, or monitoring video pictures of a plurality of selected intersections alternately in some order; and history playback refers to playing back, viewing, and downloading a historically monitored picture.

Thirdly the basic data service will be described. The basic data service refers to managing basic data as per four categories of user management, traffic control, field devices, and control instructions for the purpose of better providing the basic data service for the control server, where the basic data service of the category of user management can provide the control server with a service of managing data related to user privileges and user roles; the basic data service of the category of traffic control can provide the control server with a service of managing information about roads in the respective traffic areas, information about the number of field devices and the positions where the field devices are installed; the basic data service of the category of field devices can provide the control server with a service of managing device names of the field devices, the times when the field devices are installed, and operating parameters of the field devices; and the basic data service of the category of control instruction can provide the control server with a service of managing a control instruction issued by the control server to the field device.

Fourthly vehicle information recording and monitoring will be described. Vehicle records include a blacklist record, an inspection spot record, and a regulation violation record, where locus playback and picture presentation functions of vehicles recorded in the blacklist are further provided; the inspection spot record provides functions of inquiring about and exporting data of respective toll-gates (e.g., a toll station, an overspeed checking station, etc.); and the regulation violation record provides functions of inquiring about, exporting, and filtering data of regulation-violating vehicles. Moreover when monitoring a vehicle, to obtain information about the vehicle, some vehicle can be selected and the traveling locus thereof can be monitored.

Fifthly operation and maintenance management will be described. Operation and maintenance management refers to recording a failure log, a running log, and an operating log of the control server, where knowledge of the operating condition of the control server can be gained from these data, and the control server can be maintained in a timely manner, thus enabling the control server to operate normally.

The interface module 103 is configured to obtain the data to be processed from the at least one control server, to transmit the data to be processed to the central managing and controlling module; and to transmit the second control instruction issued by the central managing and controlling module to the at least one control server.

Optionally the interface module 103 includes one or more of a traffic data interface unit, a video interface unit, a regulation violation data interface unit, and a system data interface unit, where the traffic data interface unit is configured to obtain the traffic data of the control server; the video interface unit is configured to obtain the video data of the control server; the regulation violation data interface unit is configured to obtain the vehicle regulation violation data of the control server; and a system data interface unit is configured to obtain the control information of the control server for the field device.

The respective interface units above will be described below respectively.

The traffic data interface unit is configured to obtain a vehicle flow, a vehicle speed, whether there is a traffic jam on a road, and other data, from the control server, where the obtained data through the traffic data interface unit can be configured for inquiring about, analyzing, and making a statistic of historical traffic data, the operating state (enabled or disabled) of the field device can be indicated in real-time using real-time data of the traffic data interface unit, and calculation can be performed on the obtained data.

The video interface unit is configured to obtain the video data of the control server. One or more of video record data, real time video data, and central control data, can be determined according to the obtained video data. Where the video record data can be configured for historical video playing and file downloading, the real time video data can be configured for real time video playing, and alternating monitoring of sites to be monitored, and the central control data can be configured for changing shooting position of electronic eyes or cameras at the sites to be monitored.

The regulation violation data interface unit is configured to obtain the vehicle regulation violation data of the control server. Persist data and/or real time data can be determined according to the vehicle regulation violation data, where the persist data can be configured for inquiring about, analyzing, and making a statistic of regulation-violating vehicles, and the real time data can be configured for tracking a seriously regulation violating vehicle, and notifying the police of a vehicle in the blacklist.

The system data interface unit is an extended interface unit provided by the central system, where there may be a plurality of system data interface units. Here the system data interface unit can include a signal control interface unit and an inspection spot interface unit.

Particularly the signal control interface unit is configured to obtain the control information of the control server on the field device. One or more of persist data, real time data and central control data, can be determined according to the obtained control information, where the persist data can be configured for inquiring about, analyzing, and making a statistic of the control information, the real time data can be configured for real time data calculation, and the central control data can be configured for the central system to control and configure the control server remotely.

The inspection spot interface unit is configured to obtain traffic information detected by some field devices Persist data and/or real time data can be obtained according to the obtained traffic information, where the persist data can be configured for inquiring about a locus of, analyzing a behavior of, and making a static of vehicles passing an inspection spot, and the real time data can be configured for tracking vehicles, and detecting a vehicle in the blacklist, using real time data.

The functions of the central interacting module 101, the central managing and controlling module 102, and the interface module 103 will be further described below in the three data collecting modes of the central system.

In the first data collecting mode, the central system detects in real time the state data of the control server.

Here the state data of the control server includes information of whether the control server fails, and information of whether the control server is connected normally over the network. If it is determined that the state data of the control server is abnormal, then a corresponding traffic operator will be instructed in a timely manner to handle it.

Particularly the central interacting module 101 further includes: a real time interacting unit configured, when there is a need for monitoring the state data of the control server in real time, to generate the first control instruction to monitor the state data in real time, and to transmit the first control instruction to a real time managing and controlling unit.

The central managing and controlling module 102 further includes: the real time managing and controlling unit configured to receive the first control instruction transmitted by the real time interacting unit, to obtain the state data transmitted by the at least one control server through a real time transmitting unit according to the first control instruction, and to process the obtained state data to generate the second control instruction; and to issue the second control instruction to the at least one control server through the real time transmitting unit.

The interface module 103 further includes: the real time transmitting unit configured to obtain the state data from the at least one control server, to transmit the state data to the real time managing and controlling unit and to transmit the second control instruction issued by the real time managing and controlling unit to the at least one control server.

In the second data collecting mode, the central system inquires data from the control server in a non-real time manner.

Here the central system can inquire information about illegal vehicles from the control server periodically, e.g., monthly, and then the central system can analyze and process the information about the illegal vehicles transmitted by a plurality of control servers, and obtain routes over which the illegal vehicles frequently occur to thereby intercept the illegal vehicles over these routes.

Furthermore the central interacting module 101 further includes: a non-real time interacting unit configured, when there is a need for inquiring about data from the control server in a non-real time manner, to generate the first control instruction to inquire about data in a non-real time manner, and to transmit the first control instruction to a non-real time managing and controlling unit.

The central managing and controlling module 102 further includes: a non-real time managing and controlling unit configured to receive the first control instruction transmitted by the non-real time interacting unit, to obtain inquiry data transmitted by the at least one control server though a non-real time transmitting unit according to the first control instruction, and to process the obtained inquiry data to generate the second control instruction; and to issue the second control instruction to the at least one control server through the non-real time transmitting unit.

The interface module 103 further includes: the non-real time transmitting unit configured to obtain the inquiry data from the at least one control server, to transmit the inquiry data to the non-real time managing and controlling unit, and to transmit the second control instruction issued by the non-real time managing and controlling unit to the at least one control server.

In the third data collecting mode, the central system subscribes to data from the control server as needed.

Here the control server can transmit traffic data obtained upon detecting a local traffic jam or a local traffic accident, and the central system can further manage and control the plurality of control servers according to these data.

Particularly the central interacting module 101 further includes: a subscription interacting unit configured, when there is a need for subscribing to data from the control server, to generate the first control instruction to subscribe to data, and to transmit the first control instruction to a subscription managing and controlling unit.

The central managing and controlling module 102 further includes: the subscription managing and controlling unit configured to receive the first control instruction transmitted by the subscription interacting unit, to obtain subscription data transmitted by the at least one control server through a subscription transmitting unit according to the first control instruction, and to process the obtained subscription data to generate the second control instruction; and to issue the second control instruction to the at least one control server through the subscription transmitting unit.

The interface module 103 further includes: the subscription transmitting unit configured to obtain the subscription data from the at least one control server, to transmit the subscription data to the subscription managing and controlling unit, and to transmit the second control instruction issued by the subscription managing and controlling unit to the at least one control server.

Optionally the central system further includes one or more of the following modules:

A network service module 104 is configured to respond to an access request of an intelligent terminal to the central system over the network.

A message service module 105 configured to provide correspondence between the first control instruction, and the data format of data to be collected, so that the central managing and controlling module requests for data from the control server, according to the correspondence.

Particularly the message service module can determine data format matching with the first control instruction, and an interface unit passed by the data to be acquired, upon reception of the first control instruction. For example, if the first control instruction is to obtain vehicle regulation violation information collected from 9:00 to 13:00 on that day, then the message service module will determine the data format matching the first control instruction is Date—Time—License plate number of regulation violating vehicle—Regulation violation photo—Vehicle violation times, and the interface unit passed by the vehicle regulation violation data is the regulation violation data interface unit.

A geographic information system service module 106 is configured to provide the central system with a road planning service to manage and control the control server, according to a geographical database.

A content database module 107 particularly includes a real time database configured to store state data, a non-real time database configured to store inquiry data, and a message database configured to store subscription data, where the state data, the inquiry data, and the subscription data are obtained from the control server, and to thereby provide the central system with the basic traffic data to manage and control the control server.

A geographical database module 108 is configured to store road positional information in an area managed and controlled by the central system, and to provide the central system with the road positional information to manage and control the control server.

Optionally the central system further includes:

An information distributing module 109, which is configured to generate information to be distributed, and to transmit the information to be distributed, to at least one of the plurality of control servers.

Particularly the information distributing module can provide real time traffic information to be distributed, and pass the traffic information to travelers in a timely manner, so that the traveler can know the traffic condition at any time, and select reasonably a traveling route, thus preventing and alleviating in effect a traffic jam, distributing equally the traffic flow, and improving the efficiency of passing over the roads.

For example, if a traffic department notifies that some roads need to be maintained in the coming days, then the information distributing module will distribute an information about road maintenance, and display the information about road maintenance on the traffic display device of the related control server so as to enable the traveler to know the road traffic information at any time, and to select reasonably a traveling route.

Furthermore the information distributing module 109 can be further configured to receive traffic processing data, from the control server, transmitted through the interface module, where the traffic processing data includes acknowledgement information transmitted by the control server upon reception of the control instruction (the first control instruction or the second instruction), and further includes alert information transmitted by the control server to the system operator upon detecting a traffic jam or a traffic accident.

Optionally the central system further includes:

A user accessing module 110 is configured to provide a user access interface via which an operation instruction from a system operator is received.

In the embodiments of this application, the intelligent traffic cloud control system includes at least a central system, a plurality of control servers, and a plurality of field devices, wherein the central system is connected with the control servers over a network, and the field devices are connected with the control servers over IP address based broadband buses; and the central system is configured to collect data in one or more of the following data collecting modes: monitoring state data of the control servers in real time, inquiring about data from the control servers in non-real time, and subscribing data from the control servers as needed. In the embodiments of this application, the central system can monitor in real time both operating conditions of the control servers, and local traffic conditions of the control servers; and can further inquire traffic data of the control servers from the control servers as needed in a non-real time manner; and moreover some condition can be further preset in the central system, and if the condition is triggered, then the traffic data will be transmitted automatically to the central system. As can be apparent, the central system in the embodiments of this application can obtain data selectively from the control servers to thereby alleviate a burden on the central system so as to improve the operating rate thereof.

Those skilled in the art shall appreciate that the embodiments of this application can be embodied as a method, a system or a computer program product. Therefore this application can be embodied in the form of an all-hardware embodiment, an all-software embodiment or an embodiment of software and hardware in combination. Furthermore this application can be embodied in the form of a computer program product embodied in one or more computer useable storage mediums (including but not limited to a disk memory, a CD-ROM, an optical memory, etc.) in which computer useable program codes are contained.

This application has been described in a flow chart and/or a block diagram of the method, the device (system) and the computer program product according to the embodiments of this application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of this application have been described, those skilled in the art benefiting from the underlying inventive concept can make additional modifications and variations to these embodiments. Therefore the appended claims are intended to be construed as encompassing the preferred embodiments and all the modifications and variations coming into the scope of this application.

Evidently those skilled in the art can make various modifications and variations to this application without departing from the spirit and scope of this application. Thus this application is also intended to encompass these modifications and variations thereto so long as the modifications and variations come into the scope of the claims appended to this application and their equivalents.

The invention claimed is:

1. An intelligent traffic cloud control system based central system, wherein the intelligent traffic cloud control system at least comprises the central system, a plurality of control servers, one or more processor and a plurality of field devices, wherein the central system is connected with the control servers over a network, and the field devices are connected with the control servers over IP address based broadband buses; and the central system is configured to collect data in one or more of following data collecting modes:

monitoring state data of the control servers in real time, inquiring about data from the control servers in non-real time, and subscribing to data from the control servers as needed;

wherein the central system comprises: a central interacting module configured to determine a first control instruction corresponding to selected one of the data collecting modes, and to transmit the first control instruction to a central managing and controlling module:

the central managing and controlling module configured to receive the first control instruction transmitted by the central interacting module, and according to the first control instruction, to obtain data to be processed which is transmitted by at least one control server through an interface module, and to process the obtained data to be processed to generate a second control instruction: and to issue the second control instruction to the at least one control server through the interface module, wherein the data to be processed are data collected in the selected data collecting mode: and the interface module configured to obtain the data to be processed from the at least one control server, to transmit the data to be processed to the central managing and controlling module: and to transmit the second control instruction issued by the central managing and controlling module to the at least one control server;

the central interacting module further comprises: a real time interacting unit configured, when there is a need for monitoring state data of the control server in real time, to generate the first control instruction to monitor the state data in real time, and to transmit the first control instruction to a real time managing and controlling unit;

the central managing and controlling module further comprises: the real time managing and controlling unit configured to receive the first control instruction transmitted by the real time interacting unit, to obtain the state data transmitted by the at least one control server through a real time transmitting unit according to the first control instruction, and to process the obtained state data to generate the second control instruction; and to issue the second control instruction to the at least one control server through the real time transmitting unit; and the interface module further comprises: the real time transmitting unit configured to obtain the state data from the at least one control server, to transmit the state data to the real time managing and controlling unit, and to transmit the second control instruction issued by the real time managing and controlling unit to the at least one control server.

2. The central system according to claim 1, wherein:
the central interacting module further comprises: a non-real time interacting unit configured, when there is a need for inquiring about data from the control server in a non-real time manner, to generate the first control instruction to inquire about data in a non-real time manner, and to transmit the first control instruction to a non-real time managing and controlling unit;
the central managing and controlling module further comprises: a non-real time managing and controlling unit configured to receive the first control instruction transmitted by the non-real time interacting unit, to obtain inquiry data transmitted the at least one control server though a non-real time transmitting unit according to the first control instruction, and to process the obtained inquiry data to generate the second control instruction; and to issue the second control instruction to the at least one control server through the non-real time transmitting unit; and
the interface module further comprises: the non-real time transmitting unit configured to obtain the inquiry data from the at least one control server, to transmit the inquiry data to the non-real time managing and controlling unit, and to transmit the second control instruction issued by the non-real time managing and controlling unit to the at least one control server.

3. The central system according to claim 1, wherein:
the central interacting module further comprises: a subscription interacting unit configured, when there is a need for subscribing to data from the control server, to generate the first control instruction to subscribe to data, and to transmit the first control instruction to a subscription managing and controlling unit;
the central managing and controlling module further comprises: the subscription managing and controlling unit configured to receive the first control instruction transmitted by the subscription interacting unit, to obtain subscription data transmitted by the at least one control server through a subscription transmitting unit according to the first control instruction, and to process the obtained subscription data to generate the second control instruction; and to issue the second control instruction to the at least one control server through the subscription transmitting unit; and
the interface module further comprises: the subscription transmitting unit configured to obtain the subscription data from the at least one control server, to transmit the subscription data to the subscription managing and controlling unit, and to transmit the second control instruction issued by the subscription managing and controlling unit to the at least one control server.

4. The central system according to claim 1, wherein the central system further comprises one or more of following modules:
a network service module configured to respond to an access request of an intelligent terminal to the central system over the network;
a message service module configured to provide correspondence between the first control instruction, and data format of data to be collected, so that the central managing and controlling module collects data from the control server, according to the correspondence;
a geographic information system service module configured to provide the central system with a road planning service to manage and control the control server, according to a geographical database;
a content database module comprising a real time database configured to store state data, a non-real time database configured to store inquiry data, and a message database configured to store subscription data, wherein the state data, the inquiry data, and the subscription data are obtained from the control server and used for providing the central system with basic traffic data to manage and control the control server; and a geographical database module configured to store road positional information in an area managed and controlled by the central system, and to provide the central system with the road positional information to manage and control the control server.

5. The central system according to claim 1, wherein the central system further comprises: an information distributing module configured to generate information to be distributed, and to transmit the information to be distributed, to at least one of the plurality of control servers.

6. The central system according to claim 1, wherein the central system further comprises: a user accessing module configured to provide a user access interface via which an operation instruction from a system operator is received.

7. The central system according to claim 1, wherein the central managing and controlling module is further configured to perform one or more of: operation monitoring, video monitoring, a basic data service, vehicle information recording and monitoring, and operation and maintenance management.

8. The central system according to claim 1, wherein the interface module comprises one or more of: a traffic data interface unit configured to obtain traffic data of the control server according to the selected data collecting mode; a video interface unit configured to obtain video data of the control server according to the selected data collecting mode.

* * * * *